(12) United States Patent
Zhu et al.

(10) Patent No.: US 11,995,901 B2
(45) Date of Patent: May 28, 2024

(54) METHOD AND SYSTEM FOR DETECTING SCENE TEXT (71) Applicant: Zhejiang Wanli University, Zhejiang (CN)

(72) Inventors: Zhongjie Zhu, Zhejiang (CN); Guanglong Liao, Zhejiang (CN); Yongqiang Bai, Zhejiang (CN); Yuer Wang, Zhejiang (CN)

(73) Assignee: Zhejiang Wanli University, Zhejiang (CN)

( * ) Notice: Subject to any disclaimer, the term of this patent is extended or adjusted under 35 U.S.C. 154(b) by 344 days.

(21) Appl. No.: 17/565,405

(22) Filed: Dec. 29, 2021

(65) Prior Publication Data
US 2022/0207890 A1 Jun. 30, 2022

(30) Foreign Application Priority Data
Dec. 30, 2020 (CN) .......................... 202011599888.7

(51) Int. Cl.
*G06V 10/82* (2022.01)
*G06V 10/77* (2022.01)
*G06V 10/774* (2022.01)
*G06V 10/80* (2022.01)
*G06V 20/62* (2022.01)

(52) U.S. Cl.
CPC .......... *G06V 20/63* (2022.01); *G06V 10/7715* (2022.01); *G06V 10/774* (2022.01); *G06V 10/806* (2022.01); *G06V 10/82* (2022.01)

(58) Field of Classification Search
CPC ...... G06V 20/63; G06V 10/80; G06V 10/806; G06V 10/7715; G06V 10/82; G06V 10/774
See application file for complete search history.

(56) References Cited

FOREIGN PATENT DOCUMENTS

CN 112001931 A * 11/2020 ........... G06N 3/0454

* cited by examiner

*Primary Examiner* — Sumati Lefkowitz
*Assistant Examiner* — Michael Adam Shariff
(74) *Attorney, Agent, or Firm* — JCIP GLOBAL INC.

(57) ABSTRACT

A method and a system for detecting a scene text are provided. The method includes: acquiring a scene text picture in a preset manner, pre-processing the acquired scene text picture, detecting the pre-processed scene text picture with a training model for scene text detection, and acquiring a detection result. Accordingly, the method and the system have an original PSENet (Progressive Scale Expansion Network) backbone network ResNet (Deep Residual Network) is replaced with a rich feature structure network (i.e. Res2NeXt (Combination of Res2Net and ResNeXt)) to improve a network feature extraction capability, thereby increasing a text detection precision of the network; mixed pooling is added at an appropriate location in the backbone network to acquire useful context information by performing pooling operations of different kernel shapes and capture long and short distance dependency relationships between different locations, thereby further increasing the text detection precision of the network.

3 Claims, 8 Drawing Sheets

| Backbone | Precision (%) | Recall (%) | F-Measure (%) | FPS | Model Size |
|---|---|---|---|---|---|
| Res2NeXt | 86.33 | 80.55 | 83.44 | 1.65 | 333.4MB |
| Res2NeXt with SP | 86.25 | 80.06 | 83.05 | 2.28 | 333.4MB |
| Res2NeXt with MPM | 87.26 | 80.79 | 84.00 | 1.84 | 333.4MB |

METHOD AND SYSTEM FOR DETECTING SCENE TEXT

CROSS-REFERENCE TO RELATED APPLICATION

This application claims the priority benefit of China application serial no. 202011599888.7, filed on Dec. 30, 2020. The entirety of the above-mentioned patent application is hereby incorporated by reference herein and made a part of this specification.

BACKGROUND

Technical Field

The disclosure relates to the field of machine vision technologies, and in particular to a method and a system for detecting a scene text.

Description of Related Art

Natural scene text detection technology, as a key point in scene text recognition tasks, is widely used in computer vision application scenes, such as autonomous driving technology, unmanned supermarket, and traffic sign recognition. A method for detecting a scene text also plays an important role in different text systems. However, compared to general target detection, natural scene text detection is more complex for following reasons. (1) Text positioning detection cannot be accurately performed based on an algorithm due to internal conditions of different text changes such as fonts, colors, shapes, directions and proportions. (2) The natural scene text detection is also very challengeable due to actual external conditions such as uneven illumination and blocked scene text in a natural scene.

SUMMARY

An object of the disclosure is to provide a method for training a model for scene text detection and a method for detecting a scene text, so as to solve the technical problem of incomplete and inaccurate detection of an conventional network structure.

To achieve the above object, the disclosure adopts the following technical solutions.

A method for detecting a scene text includes the following steps.

In step S1, a scene text picture is acquired in a preset manner.

In step S2, the scene text picture, which is acquired, is pre-processed.

In step S3, the scene text picture, which is pre-processed, is detected with a training model for scene text detection, and a detection result is acquired.

Acquiring the training model in the step S3 specifically includes the following steps.

In step S31, the scene text picture is acquired in the preset manner, and a data set is established.

In step S32, the scene text picture in the data set is processed.

In step S33, the training model is acquired by training the pre-processed scene text picture through a rich feature structure network (i.e. Res2NeXt) and mixed pooling.

The step S33 specifically includes the following steps.

In step S331, a plurality of single-layer feature maps are acquired from the scene text picture.

In step S332, different types of context information and a distance dependency relationship between different locations are acquired from the plurality of single-layer feature maps through mixed pooling.

In step S333, feature maps at different layers are acquired by fusing the feature maps processed with mixed pooling in a preset manner.

In step S334, a fused feature map is acquired by combining the feature maps at different layers.

In step S335, a predicted scene text picture is acquired from the fused feature map based on a progressive scale expansion algorithm.

In step S336, the training model is acquired by training the acquired predicted scene text picture.

Furthermore, the step S331 is performed in the following specific processes.

Addition is performed after the scene text picture is convoluted through a first convolutional layer and a second convolutional layer in sequence, and then, a result of addition is convoluted through a third convolutional layer, a first-layer feature map is acquired by adding a result output through the third convolutional layer to the input picture (i.e. the feature map that is input), and a plurality of single-layer feature maps are acquired by repeating the above steps with the first-layer feature map.

Furthermore, the step S332 includes the following steps.

In step S3321, the feature maps at different layers are input into a mixed pooling module.

In step S3322, strip pooling and pyramid pooling are performed for the feature maps, which are input, respectively.

In step S3323, a relationship feature map including different types of context information and the distance dependency relationship between different locations is acquired by fusing the feature maps processed with strip pooling and pyramid pooling.

A system for detecting a scene text includes:
a picture acquiring module, configured to acquire a scene text picture in a preset manner;
a picture pre-processing module, configured to pre-process the acquired scene text picture; and
a picture detecting module, configured to detect the pre-processed scene text picture with a training model for scene text detection and acquire a detection result.

Furthermore, the picture detecting module includes:
a picture acquiring and storing unit, configured to acquire the scene text picture in the preset manner and establish a data set;
a picture processing unit, configured to process the scene text picture in the data set; and
a training unit, configured to acquire the training model by training the processed scene text picture through a rich feature structure network (i.e. Res2NeXt) and mixed pooling.

Furthermore, the picture training unit includes:
a feature map acquiring unit, configured to acquire a plurality of single-layer feature maps from the scene text picture;
a mixed pooling unit, configured to acquire different types of context information and a distance dependency relationship between different locations from the plurality of single-layer feature maps through mixed pooling;
a fusing unit, configured to acquire feature maps at different layers by fusing the feature maps processed with mixed pooling in the preset manner;

a feature map combining unit, configured to acquire a fused feature map by combining the feature maps at different layers;

a picture text predicting unit, configured to acquire a predicted scene text picture from the fused feature map based on a progressive scale expansion algorithm; and a feature training unit, configured to acquire the training model by training the acquired predicted scene text picture.

Furthermore, the mixed pooling unit includes:

a feature map inputting sub-unit, configured to input the feature maps at different layers into the mixed pooling unit;

a pooling sub-unit, configured to perform strip pooling and pyramid pooling for the input feature maps respectively; and a pooling fusing sub-unit, configured to acquire a relationship feature map including different types of context information and the distance dependency relationship between different locations by fusing the feature maps processed with strip pooling and pyramid pooling respectively.

Compared with the conventional art, the present disclosure at least includes the following beneficial effects.

(1) An original PSENet (Progressive Scale Expansion Network) backbone network ResNet (Deep Residual Network) is replaced with a rich feature structure network (i.e. Res2NeXt) to improve a network feature extraction capability, thereby increasing a text detection precision of the network.

(2) Mixed pooling is added at an appropriate location in the backbone network to acquire useful context information by performing pooling operations of different kernel shapes, and to capture dependency relationships of long and short distance between different locations, thereby further increasing the text detection precision of the network.

DESCRIPTION OF THE EMBODIMENTS

Specific embodiments of the present invention are described below, and technical solutions of the present invention are further described in combination with accompanying drawings. However, the present invention is not limited to these embodiments.

First Embodiment

Figure 1:
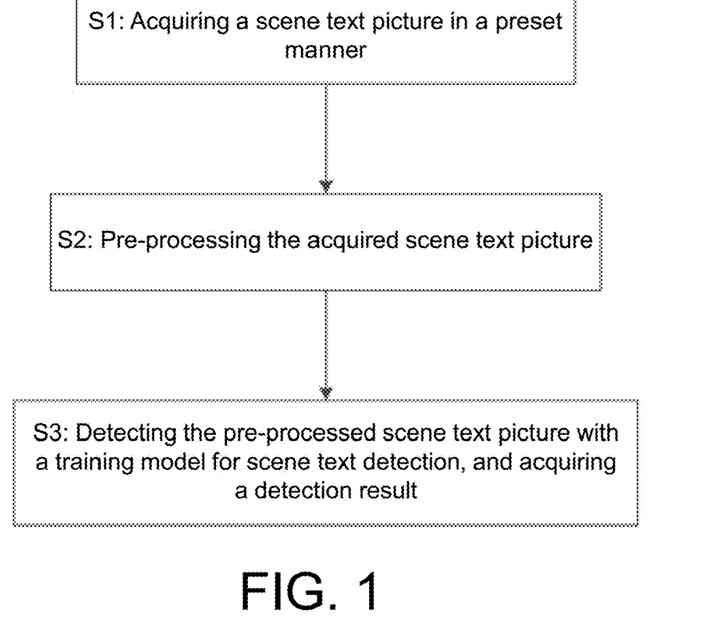
FIG. 1 is an overall flow chart according to a first embodiment of the disclosure.

As shown in FIG. 1, the present invention provides a method for detecting a scene text.

A method for detecting a scene text includes the following steps.

In step S1, a scene text picture is acquired in a preset manner.

In step S2, the acquired scene text picture is pre-processed.

In step S3, the pre-processed scene text picture is detected with a training model for scene text detection, and a detection result is acquired.

Figure 2:
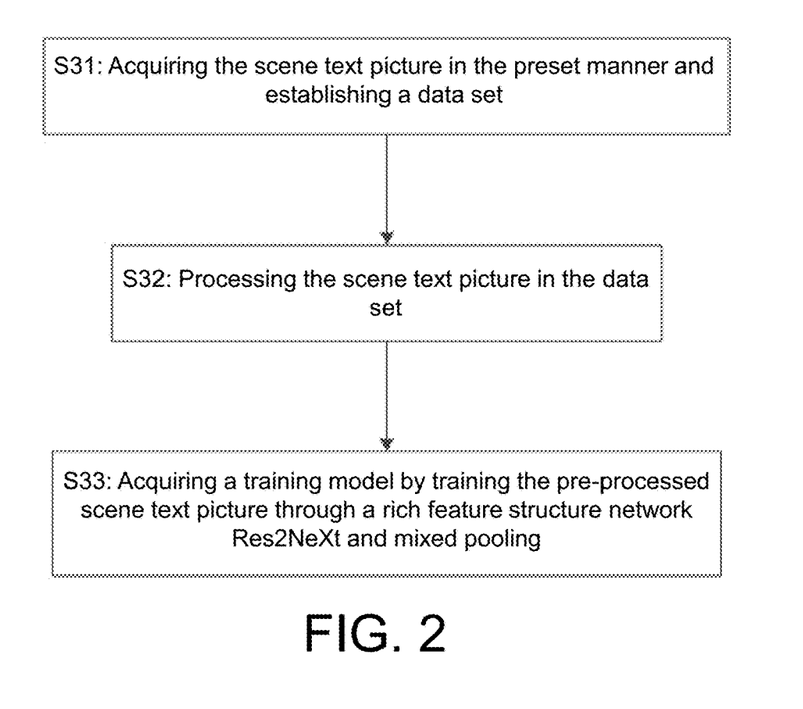
FIG. 2 is a flow chart of step S3 according to the first embodiment of the disclosure.

As shown in FIG. 2, acquiring the training model in the step S3 specifically includes the following steps.

In step S31, the scene text picture is acquired in the preset manner, and a data set is established.

In step S32, the scene text picture in the data set is processed.

In step S33, the training model is acquired by training the pre-processed scene text picture through a rich feature structure network Res2NeXt and mixed pooling.

Figure 3:
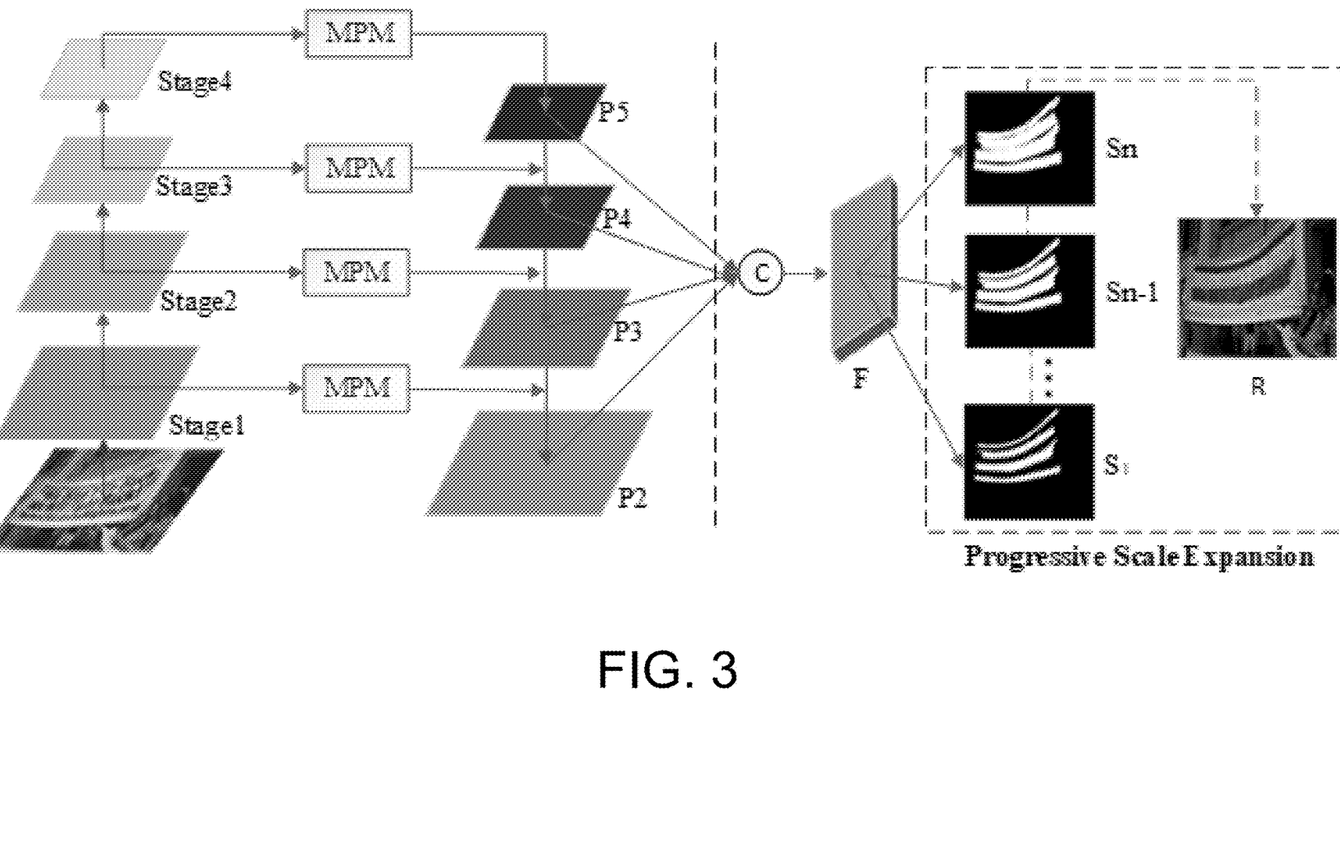
FIG. 3 is a schematic diagram of the architecture of a feature structure network according to the first embodiment of the disclosure.

Furthermore, as shown in FIG. 3, the step S33 specifically includes the following steps.

In step S331, a plurality of single-layer feature maps are acquired from the scene text picture.

In step S332, different types of context information and a distance dependency relationship between different locations are acquired from the plurality of single-layer feature maps through a mixed pooling module.

In step S333, feature maps at different layers are acquired by fusing the feature maps processed with mixed pooling in a preset manner.

In step S334, a fused feature map is acquired by combining the feature maps at different layers.

In step S335, a predicted scene text picture is acquired from the fused feature map based on a progressive scale expansion algorithm.

In step S336, the training model is acquired by training the acquired predicted scene text picture.

Figure 4:
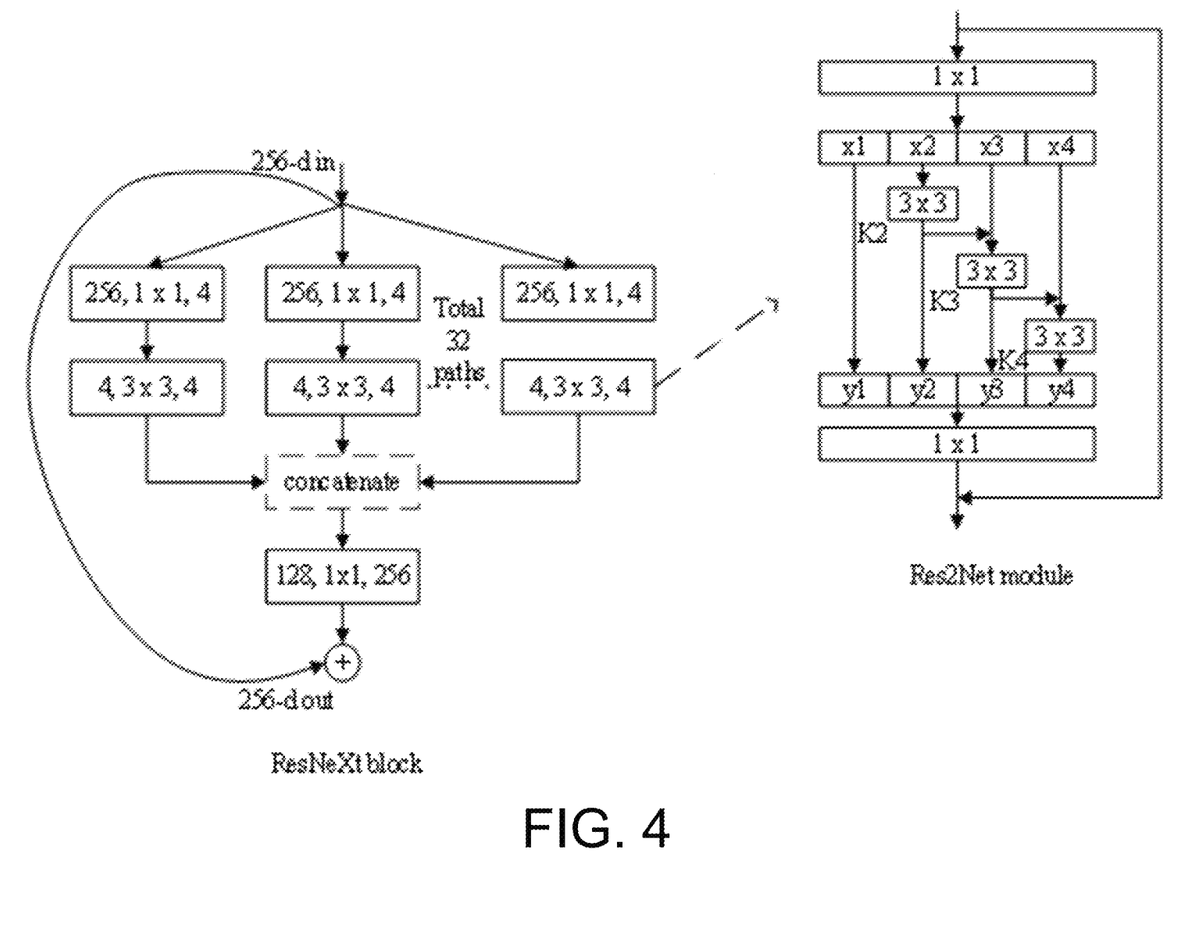
FIG. 4 is a schematic diagram of step S331 according to the first embodiment of the disclosure.

As shown in FIG. 4, the step S331 is performed in the following specific processes. Addition is performed after the scene text picture is convoluted through a first convolutional layer and a second convolutional layer in sequence, and then, a result of addition is convoluted through a third convolutional layer, a first-layer feature map is acquired by adding a result output through the third convolutional layer to the input picture, and a plurality of single-layer feature maps are acquired by repeating the above process with the first-layer feature map.

ResNeXt is a combination of ResNet (Deep Residual Network) and Inception, and actually is a grouped convolution. The number of groups is controlled by a variable cardinality c. That is, the number of channels of feature maps generated by each branch is n (let the number of input channels be m and the variable cardinality be c, then m=n×c, n>1).

A small residual block is added into each residual module in a ResNeXt network. Specifically, filters of m channels in the ResNeXt network are replaced with a smaller filter bank that has n channels (let m=n×s, without consideration of loss of universality). At the same time, more feature information of different scales is acquired by connecting different filter banks in a residual layered manner to effectively improve model performance.

Specifically, after convolution, feature mapping is averaged into s feature mapping sub-sets denoted as xi, wherein i∈{1, 2 . . . , s}. The number of channels of each feature sub-set is equal to 1/s of the input feature mapping, with same spatial size. Except for ×1, each feature sub-set has a corresponding 3×3 convolution denoted as Ki( ), wherein yi refers to an output of Ki( ) and an input of Ki( ) is a sum of the feature sub-set and an output of Ki−1( ) The 3×3 convolution at the omission is used to increase s and reduce parameters. Therefore, yi may be written as follows:

$$y_i = \begin{cases} x_{i,} & i = 1 \\ K_{i,} & i = 2 \\ K_i(x_{i,} + y_{i,} - 1), & 2 < 1 \leq s \end{cases}$$

In a Res2Net module, multi-scale processing is performed to fuse the information of different scales by convolution, thereby effectively processing the feature information. The Res2Net module is applied to the ResNeXt network to help extraction of global and local information, thereby effectively improving a feature extraction capability of the network and further increasing a text detection precision of the model.

Figure 5:
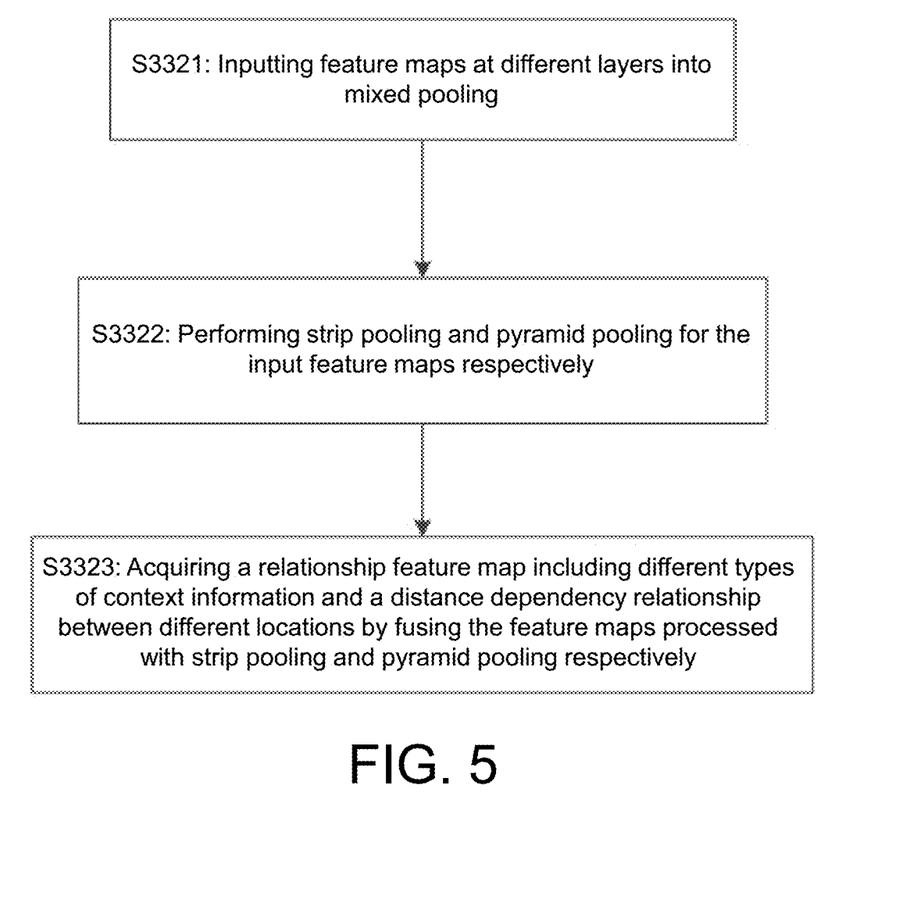
FIG. 5 is a flow chart of step S332 according to the first embodiment of the disclosure.

Furthermore, as shown in FIG. 5, the step S332 includes the following steps.

In step S3321, the feature maps at different layers are input into mixed pooling.

In step S3322, strip pooling and pyramid pooling are performed for the input feature maps respectively.

In step S3323, a feature map including different types of context information and the distance dependency relationship between different locations is acquired by fusing the feature maps processed with strip pooling and pyramid pooling respectively.

Figure 6:
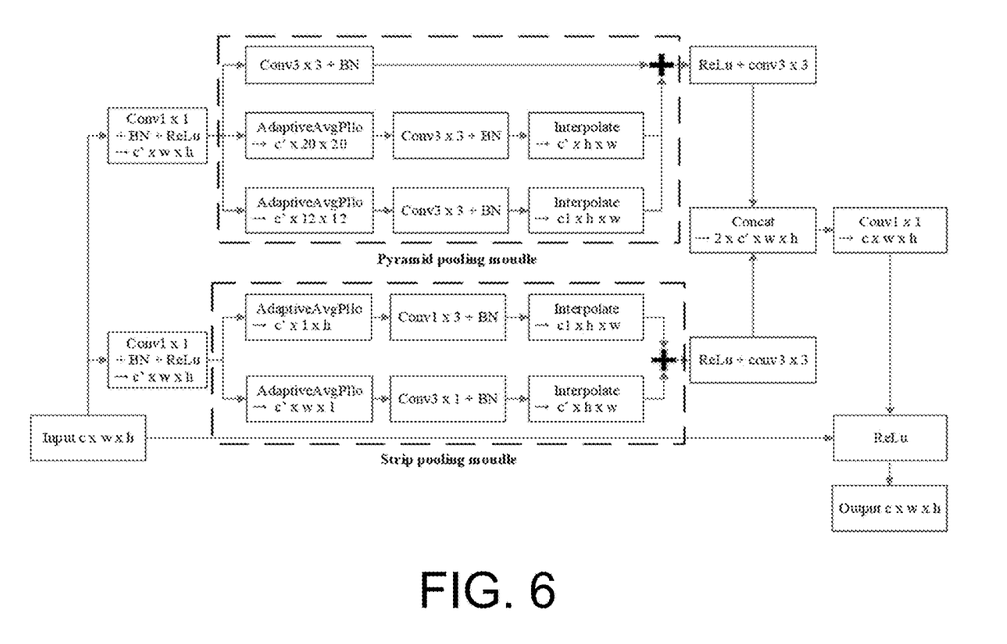
FIG. 6 is a structural schematic diagram of a composition of a mixed pooling module according to the first embodiment of the disclosure.

As shown in FIG. 6, strip pooling is performed in the following specific process. A feature map with a size being C×H×W is input; then, the input feature map is processed with horizontal and vertical strip pooling and converted into feature maps of C×H×1 and C×1×w; next, the feature maps are convoluted through a 1×1 convolution with a convolution kernel being 3 and expanded for summation corresponding to the same location; finally, a feature map of C×H×W is acquired through a ReLu function (Rectified Linear Unit) and a 3×3 convolution with a convolution kernel being 3.

Pyramid pooling is performed in the following specific process. A feature map with a size being C×H×W is input, processed with pyramid pooling and converted into feature maps of C×H×W, C×20×20 and C×12×12; next, the feature maps are convoluted through a 3×3 convolution with a convolution kernel being 3 and expanded for summation corresponding to the same location; finally, a feature map of C×H×W is acquired through a ReLu function and a 3×3 convolution with a kernel being 3.

The feature map of C×H×W acquired through strip pooling and the feature map of C×H×W acquired through pyramid pooling are fused, and the fused feature map is convoluted through the 1×1 convolution with the convolution kernel being 1 and fused with the input feature maps through the ReLu function to acquire a feature map that includes different types of context information and a distance dependency relationship between different locations through the mixed pooling module.

The mixed pooling module combines the pyramid pooling with the strip pooling. The strip pooling shown in a lower part of the FIG. 5 is different from global average pooling in that only a long and narrow range rather than an entire range of the feature map is considered, thereby avoiding other connections except for a connection between long-distance locations.

Therefore, the strip pooling is mainly responsible for a long-distance dependency relationship, whereas the pyramid pooling shown in an upper part of FIG. 5 is responsible for a short-distance dependency relationship.

Finally, the mixed pooling module acquires different types of context information by performing different pooling operations and captures long and short distance dependency relationships between different locations to enable feature representation to be more distinguishable and enhance a scene analysis capability, thereby further increasing the detection precision of the network.

In step S33, feature maps at different layers are acquired by fusing the feature maps processed with mixed pooling in the following specific process. As shown in FIG. 2, firstly, a feature map P4 can be acquired by up-sampling a feature map P5 and fusing the feature map P5 with a feature map Stage3 processed with mixed pooling; then, feature maps P3 and P2 can be sequentially acquired by performing the above same operation; feature maps P2 to P5 are the required feature maps at different layers due to different numbers of channels among feature maps P2 to P5.

The fused feature map can be acquired by expanding the feature maps P2 to P5 to the same scale for combination.

Figure 7:
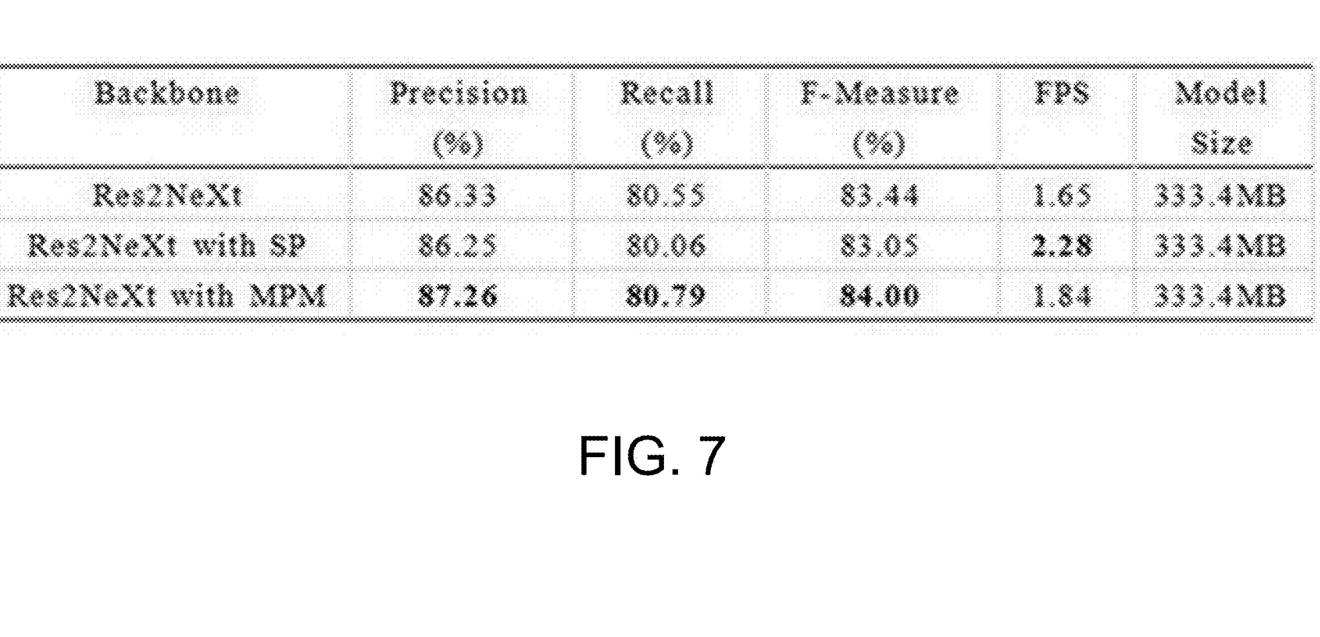
FIG. 7 is a schematic diagram of an experimental result of a mixed pooling module according to the first embodiment of the disclosure.

FIG. 7 shows performance comparison of mixed pooling and strip pooling on a backbone network, wherein "SP" refers to strip pooling added into the Res2NeXt network, and "MPM" refers to mixed pooling added into the Res2NeXt network. It can be seen from FIG. 7 that different network performance indicators are all improved after the mixed pooling is added into the backbone network, which indicates that the mixed pooling added into the backbone network can further improve the model performance of the network.

In the present invention, an original PSENet (Progressive Scale Expansion Network) backbone network ResNet (Deep Residual Network) is replaced with a rich feature structure network Res2NeXt to improve a network feature extraction capability, thereby increasing a text detection precision of the network.

Furthermore, mixed pooling is added at an appropriate location in the backbone network to acquire useful context information by performing pooling operations of different kernel shapes and capture long and short distance dependency relationships between different locations, thereby further increasing the text detection precision of the network.

Second Embodiment

Figure 8:
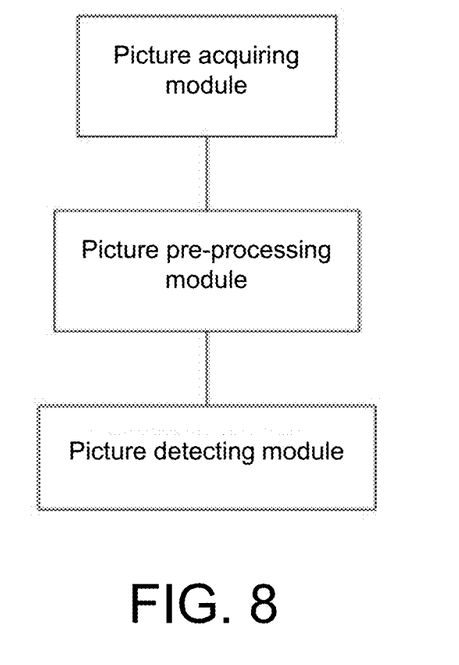
FIG. 8 is an overall flow chart according to a second embodiment of the disclosure.

As shown in FIG. 8, the present invention provides a system for detecting a scene text, including:

a picture acquiring module, configured to acquire a scene text picture in a preset manner;

a picture pre-processing module, configured to pre-process the acquired scene text picture; and a picture detecting module, configured to detect the pre-processed scene text picture with a training model for scene text detection and acquire a detection result.

Furthermore, the picture detecting module includes:
a picture acquiring and storing unit, configured to acquire the scene text picture in the preset manner and establish a data set;
a picture processing unit, configured to process the scene text picture in the data set;
and
a training unit, configured to acquire the training model by training the processed scene text picture through a rich feature structure network Res2NeXt and mixed pooling.

Furthermore, the picture training unit includes:
a feature map acquiring unit, configured to acquire a plurality of single-layer feature maps from the scene text picture;
a mixed pooling unit, configured to acquire different types of context information and a distance dependency relationship between different locations from the plurality of single-layer feature maps through mixed pooling;
a fusing unit, configured to acquire feature maps at different layers by fusing the feature maps processed with mixed pooling in a preset manner;
a feature map combining unit, configured to acquire a fused feature map by combining the feature maps at different layers;
a picture text predicting unit, configured to acquire a predicted scene text picture from the fused feature map based on a progressive scale expansion algorithm; and
a feature training unit, configured to acquire the training model by training the acquired predicted scene text picture.

Furthermore, the mixed pooling unit includes:
a feature map inputting sub-unit, configured to input the feature maps at different layers into the mixed pooling unit;
a pooling sub-unit, configured to perform strip pooling and pyramid pooling for the input feature maps respectively; and
a pooling fusing sub-unit, configured to acquire a relationship feature map including different types of context information and the distance dependency relationship between different locations by fusing the feature maps processed with strip pooling and pyramid pooling respectively.

Figure 9:
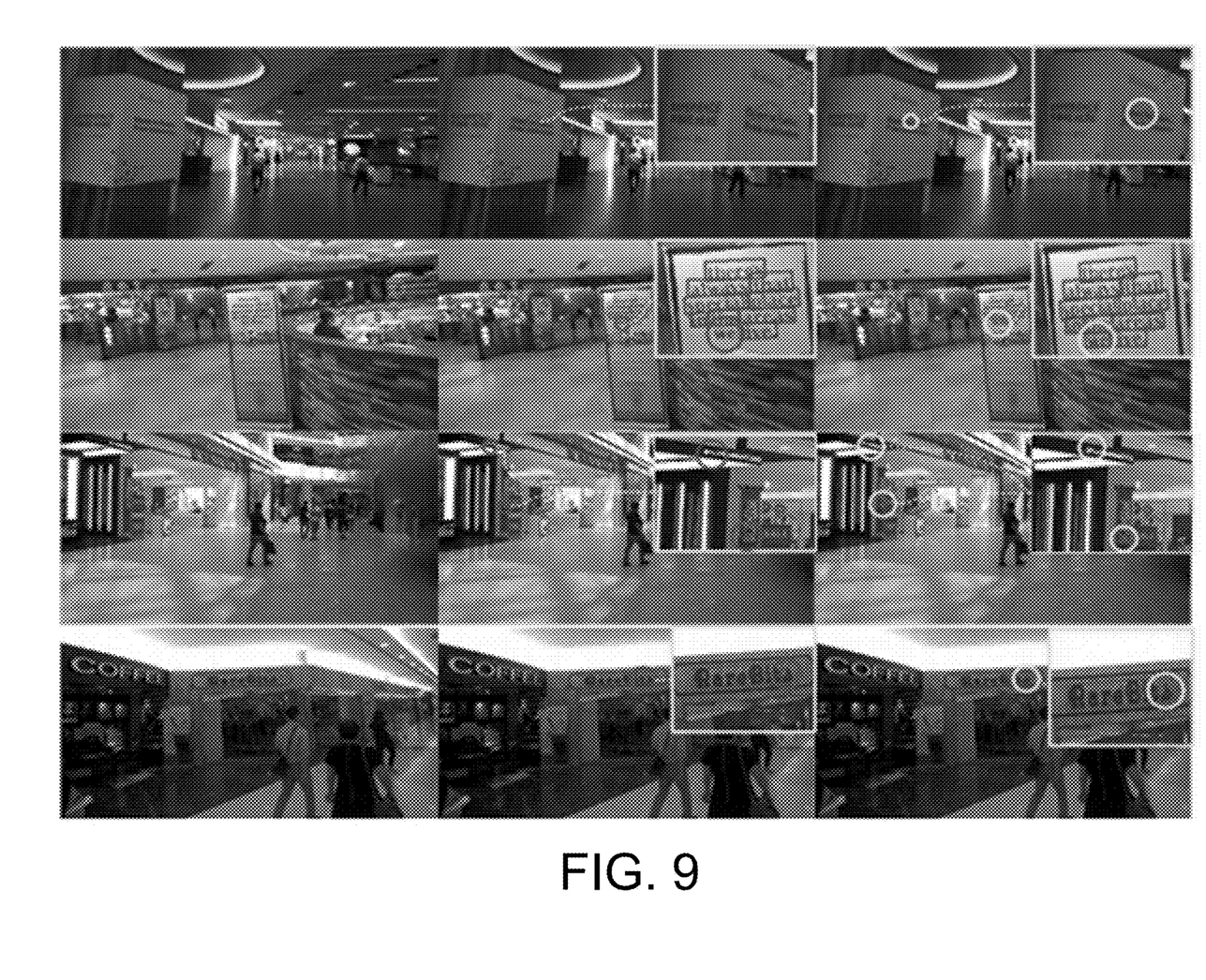
FIG. 9 is a schematic diagram of an experimental result of a mixed pooling module according to the second embodiment of the disclosure.

As shown in FIG. 9, an original picture is shown in the left column, a detection result of the original PSENet network is shown in the middle column, and a detection result of the present invention is shown in the right column. It can be seen from FIG. 9 that the detection result of the present invention shows the higher text detection precision than the detection result of the existing PSENet network.

In the present invention, the original PSENet backbone network ResNet is replaced with the rich feature structure network Res2NeXt to improve the network feature extraction capability, thereby increasing the text detection precision of the network.

In the present invention, the mixed pooling is added at the appropriate location in the backbone network to acquire useful context information by performing pooling operations of different kernel shapes and capture long and short distance dependency relationships between different locations, thereby further increasing the text detection precision of the network.

The specific embodiments described herein are merely illustrative of the spirit of the present invention. Those skilled in the art may make various modifications or supplementations or substitutions in a similar manner to the described specific embodiments without departing from the spirit of the present invention or surpassing the scope defined in the appended Claims.

What is claimed is:

1. A method for detecting a scene text, comprising the following steps:
   step S1: acquiring a scene text picture in a preset manner;
   step S2: pre-processing the scene text picture, which is acquired; and
   step S3: detecting the scene text picture, which is pre-processed, with a training model for scene text detection, and acquiring a detection result,
   wherein, the step S3, acquiring the training model comprises the following steps:
   step S31: acquiring the scene text picture in the preset manner, and establishing a data set;
   step S32: pre-processing the scene text picture in the data set; and
   step S33: acquiring the training model by training the scene text picture, which is pre-processed, through a rich feature structure network and a mixed pool;
   wherein, the step S33 specifically comprises the following steps:
   step 5331: acquiring a plurality of single-layer feature maps from the scene text picture;
   step S332: acquiring different types of context information and a distance dependency relationship between different locations from the plurality of single-layer feature maps through the mixed pool;
   step S333: acquiring feature maps at different layers by fusing the feature maps, which are processed with the mixed pool, in a preset manner;
   step S334: acquiring a fused feature map by combining the feature maps at different layers;
   step S335: acquiring a predicted scene text picture from the fused feature map based on a progressive scale expansion algorithm; and
   step S336: acquiring the training model by training the predicted scene text picture, which is acquired;
   wherein, the step S332 comprises the following steps:
   step 53321: inputting the feature maps at different layers into the mixed pool;
   step S3322: performing strip pooling and pyramid pooling for the feature maps, which are input into the mixed pool, respectively; and
   step S3323: acquiring a relationship feature map comprising the different types of context information and the distance dependency relationship between the different locations by fusing the feature maps processed with the strip pooling and the pyramid pooling respectively.

2. The method for detecting the scene text according to claim 1, wherein the step S331 comprises the following steps:
   performing an addition after convoluting the scene text picture through a first convolutional layer and a second convolutional layer in sequence;
   convoluting a result of the addition through a third convolutional layer, acquiring a first-layer feature map by adding a result that is output through the third convolutional layer to the scene text picture that is input into the rich feature network, and acquiring the plurality of single-layer feature maps by repeating the above steps with the first-layer feature map.

3. A system for detecting a scene text, comprising:
a picture acquiring module, configured to acquire a scene text picture in a preset manner;
a picture pre-processing module, configured to pre-process the scene text picture, which is acquired; and
a picture detecting module, configured to detect the scene text picture, which is pre-processed, with a training model for scene text detection and acquire a detection result,
wherein, the picture detecting module comprises:
a picture acquiring and storing unit, configured to acquire the scene text picture in the preset manner and establish a data set;
a picture processing unit, configured to pre-process the scene text picture in the data set; and
a training unit, configured to acquire the training model by training the scene text picture, which is pre-processed, through a rich feature structure network and mixed pooling;
wherein, the training unit comprises:
a feature map acquiring unit, configured to acquire a plurality of single-layer feature maps from the scene text picture;
a mixed pooling unit, configured to acquire different types of context information and a distance dependency relationship between different locations from the plurality of single-layer feature maps through the mixed pooling unit;
a fusing unit, configured to acquire feature maps at different layers by fusing the feature maps processed with mixed pooling in the preset manner;
a feature map combining unit, configured to acquire a fused feature map by combining the feature maps at different layers;
a picture text predicting unit, configured to acquire a predicted scene text picture from the fused feature map based on a progressive scale expansion algorithm; and
a feature training unit, configured to acquire the training model by training the predicted scene text picture, which is acquired;
wherein, the mixed pooling unit comprises:
a feature map inputting sub-unit, configured to input the feature maps at different layers into the mixed pooling unit;
a pooling sub-unit, configured to perform a strip pooling and a pyramid pooling for the feature maps, which are input, respectively; and
a pooling fusing sub-unit, configured to acquire a relationship feature map comprising the different types of context information and the distance dependency relationship between the different locations by fusing the feature maps processed with a strip pooling and a pyramid pooling respectively.

* * * * *